US010104345B2

(12) United States Patent
Masood et al.

(10) Patent No.: US 10,104,345 B2
(45) Date of Patent: Oct. 16, 2018

(54) DATA-ENHANCED VIDEO VIEWING SYSTEM AND METHODS FOR COMPUTER VISION PROCESSING

(71) Applicant: Sighthound, Inc., Winter Park, FL (US)

(72) Inventors: Syed Zain Masood, Orlando, FL (US); Brent Richardson, Winter Park, FL (US); Guang Shu, Winter Park, FL (US); Enrique G. Ortiz, Oviedo, FL (US); Stephen Neish, Winter Park, FL (US)

(73) Assignee: Sighthound, Inc., Winter Park, FL (US)

( * ) Notice: Subject to any disclaimer, the term of this patent is extended or adjusted under 35 U.S.C. 154(b) by 70 days.

(21) Appl. No.: 14/970,210

(22) Filed: Dec. 15, 2015

(65) Prior Publication Data

US 2016/0171283 A1   Jun. 16, 2016

Related U.S. Application Data

(60) Provisional application No. 62/092,708, filed on Dec. 16, 2014.

(51) Int. Cl.
*G06K 9/00* (2006.01)
*H04N 7/18* (2006.01)
*G06F 17/30* (2006.01)

(52) U.S. Cl.
CPC ....... *H04N 7/183* (2013.01); *G06F 17/30825* (2013.01); *G06F 17/30831* (2013.01); *G06F 17/30837* (2013.01); *G06F 17/30843* (2013.01); *G06K 9/00744* (2013.01); *H04N 7/181* (2013.01); *G06T 2210/12* (2013.01)

(58) Field of Classification Search
None
See application file for complete search history.

(56) References Cited

U.S. PATENT DOCUMENTS

| 5,802,220 A | 9/1998 | Black et al. |
| 5,812,787 A | 9/1998 | Astle |
| 6,795,567 B1 | 9/2004 | Cham et al. |

(Continued)

OTHER PUBLICATIONS

Cheng et al., "Real-Time Discriminative Background Subtraction," IEEE Transactions on Image Processing, 20(5). pp. 1401-1414. Oct. 18, 2010.

(Continued)

*Primary Examiner* — Shervin Nakhjavan
(74) *Attorney, Agent, or Firm* — Davis Wright Tremaine LLP; Philip H. Albert

(57) ABSTRACT

A data-enhanced video viewing system scans videos in order to detect and extract certain objects, such as human faces, so as to compile non-time based synopses, including "facelines" of people appearing in the video sequence. It can also provide a time-based synopsis that includes timestamps for all detected objects. The data-enhanced video viewing system can be deployed on a network for a client to request data extraction on one or more designated videos. The designated video may be one of those that have been uploaded to social networks, uploaded to online video hosting sites, streamed over the Internet or other network, or uploaded directly by the user.

25 Claims, 5 Drawing Sheets

(56) References Cited

U.S. PATENT DOCUMENTS

| | | | |
|---|---|---|---|
| 7,142,600 B1 | 11/2006 | Schonfeld et al. | |
| 7,199,798 B1 | 4/2007 | Echigo et al. | |
| 7,200,266 B2 | 4/2007 | Ozer et al. | |
| 7,460,689 B1 | 12/2008 | Chan | |
| 7,620,204 B2 | 11/2009 | Porikli et al. | |
| 7,783,118 B2 | 8/2010 | Zhou | |
| 8,036,494 B2 | 10/2011 | Chen | |
| 8,116,527 B2 | 2/2012 | Sabol et al. | |
| 8,165,345 B2 | 4/2012 | Chau | |
| 8,213,679 B2 | 7/2012 | Yao | |
| 8,243,987 B2 | 8/2012 | Hampapur et al. | |
| 8,306,267 B1 | 11/2012 | Gossweiler, III et al. | |
| 8,416,993 B2 | 4/2013 | Springer et al. | |
| 8,447,069 B2 | 5/2013 | Huang et al. | |
| 8,565,481 B1 | 10/2013 | Smith | |
| 8,875,177 B1* | 10/2014 | Sharma | H04N 21/458 705/25 |
| 9,118,886 B2* | 8/2015 | Wang | H04N 9/87 |
| 9,693,092 B2* | 6/2017 | Hu | H04N 21/4331 |
| 2002/0090114 A1* | 7/2002 | Rhoads | G06F 17/30876 382/100 |
| 2003/0165193 A1* | 9/2003 | Chen | G06T 9/004 375/240.08 |
| 2004/0233233 A1* | 11/2004 | Salkind | G06F 17/30017 715/719 |
| 2006/0227862 A1 | 10/2006 | Campbell et al. | |
| 2007/0124282 A1* | 5/2007 | Wittkotter | G06F 17/30858 |
| 2007/0250775 A1* | 10/2007 | Marsico | G06F 17/30855 715/716 |
| 2008/0037869 A1 | 2/2008 | Zhou | |
| 2009/0031382 A1* | 1/2009 | Cope | H04N 9/8205 725/115 |
| 2009/0158322 A1* | 6/2009 | Cope | H04N 9/8205 725/36 |
| 2009/0254643 A1* | 10/2009 | Terheggen | G06F 17/3005 709/223 |
| 2009/0320081 A1* | 12/2009 | Chui | H04N 7/17318 725/93 |
| 2010/0002082 A1* | 1/2010 | Buehler | G08B 13/19645 348/159 |
| 2012/0079578 A1* | 3/2012 | Dachiraju | H04N 21/2225 726/7 |
| 2012/0170832 A1* | 7/2012 | Liu | G06T 7/55 382/154 |
| 2013/0016877 A1* | 1/2013 | Feris | G06K 9/00771 382/103 |
| 2013/0125181 A1* | 5/2013 | Montemayor | H04N 21/25825 725/93 |
| 2013/0208124 A1* | 8/2013 | Boghossian | H04N 7/181 348/159 |
| 2013/0347044 A1* | 12/2013 | Lee | H04N 21/2387 725/88 |
| 2014/0023341 A1* | 1/2014 | Wang | H04N 9/87 386/240 |
| 2014/0172881 A1* | 6/2014 | Petrou | G06F 17/30256 707/748 |
| 2014/0317671 A1* | 10/2014 | Hu | H04N 21/6125 725/116 |
| 2014/0349750 A1* | 11/2014 | Thompson | A63F 13/12 463/31 |
| 2015/0063704 A1* | 3/2015 | Tobinai | G06K 9/00221 382/195 |
| 2015/0186713 A1 | 7/2015 | Cao et al. | |
| 2015/0254254 A1* | 9/2015 | Kumarasamy | G06F 17/30073 707/673 |
| 2016/0042621 A1 | 2/2016 | Hogg et al. | |
| 2016/0104056 A1 | 4/2016 | He et al. | |
| 2016/0140436 A1 | 5/2016 | Yin et al. | |
| 2016/0163064 A1* | 6/2016 | Ruf | G06T 7/20 382/103 |
| 2017/0124409 A1 | 5/2017 | Choi et al. | |
| 2017/0124415 A1 | 5/2017 | Choi et al. | |
| 2017/0229151 A1* | 8/2017 | Abecassis | G11B 27/11 |

OTHER PUBLICATIONS

Dalal et al., "Histograms of oriented gradients for human detection," IEEE Computer Society Conference on Computer Vision and Pattern Recognition, 2005. vol. 1. pp. 886-893. Jun. 25, 2005.

Déniz et al., "Face recognition using Histograms of Oriented Gradients," Pattern Recognition Letters, 32(12). pp. 1598-1603. Sep. 2011. Published ahead of print Jan. 20, 2011.

Felzenszwalb et al., "A discriminatively trained, multiscale, deformable part model," IEEE Conference on Computer Vision and Pattern Recognition, 2008. pp. 1-8. Jun. 23-28, 2008.

Felzenszwalb et al., "Cascade Object Detection with Deformable Part Models*" 2010 IEEE Conference on Computer Vision and Pattern Recognition (CVPR). pp. 2241-2248. Jun. 13-18, 2010.

Friedman et al., "Image Segmentation in Video Sequences: A Probabilistic Approach," Proceedings of the Thirteenth Conferences on Uncertainty in Artificial Intelligence. pp. 175-181. Aug. 1997.

Gao, "An Improved HOG Based Pedestrian Detector," Foundations and Practical Applications of Cognitive Systems and Information Processing, Advances in Intelligent Systems and Computing, 215. Proceedings of the First International Conference on Cognitive Systems and Information Processing, Beijing, China, Dec. 2012. pp. 577-590. 2014.

Girshick et al., "Object Detection with Grammar Models," Advances in Neural Information Processing Systems, 24. pp. 442-450. 2011.

Girshick et al., "Rich Feature Hierarchies for Accurate Object Detection and Semantic Segmentation," The IEEE Conference on Computer Vision and Pattern Recognication (CVPR). pp. 580-587. Jun. 23-28, 2014.

Girshick, "Fast R-CNN," IEEE International Conference on Computer Vision (ICCV), 2015. pp. 1440-1448. Dec. 7-13, 2015.

Krizhevsky et al., "ImageNet Classification with Deep Convolutional Neural Networks," Advances in Neural Information Processing Systems. pp. 1097-1105. 2012.

Lecun et al., "Gradient-based learning applied to document recognition," Proceedings of the IEEE, 86(11). pp. 2278-2324. Nov. 1998.

St-Charles et al., "Flexible Background Subtraction With Self-Balanced Local Sensitivity," 2014 IEEE Conference on Computer Vision and Pattern Recognition (CVPR). pp. 408-413. Jun. 23-28, 2014.

Wang et al., "An HOG-LBP Human Detector with Partial Occlusion Handling," 2009 IEEE 12th International conference on Computer Vision. pp. 32-39. Sep. 29-Oct. 2, 2009.

Ren et al., "Faster R-CNN: Towards Real-Time Object Detection with Region proposal Networks," Advances in Neural Information Processing Systems 28 (NIPS 2015) 1:91-99, date of conference Dec. 7-12, 2015.

* cited by examiner

Operations of the Computer Vision Processing Server

DATA-ENHANCED VIDEO VIEWING SYSTEM AND METHODS FOR COMPUTER VISION PROCESSING

CROSS-REFERENCE TO RELATED APPLICATION

This application claims priority from U.S. Provisional Application No. 62/092,708, filed on Dec. 16, 2014, which is hereby incorporated in its entirety by this reference.

BACKGROUND

The following presents devices, systems and methods related to video system and to the extracting of data from video sequences.

A user of video may want to extract information about a video sequence, such as the people in the video, to enhance viewing of the video or determining whether the video is even of interest. Extracting this data would conventionally require the user to go through and annotate the video sequence themselves, or else send the video out to be analyzed and wait for its return. Consequently, video viewing could be enhanced if such information could be provided real time in a more automated manner in order to enhance the video with the extracted data.

SUMMARY OF THE INVENTION

In one set of aspects, a video system of one or more servers receives a request from a client to provide specified data on a video sequence at a specified location. The video system accesses the video sequence from the specified location and analyzes the accessed video sequence to extract the specified data. The extracted specified data is provided from the video system to the client.

In other aspects, a video processing system includes one or more servers connectable over a network to one or more clients and to video files containing video sequences. In response to receiving a request from a client to provide specified data on a video sequence at a specified location, the one or more servers access the video sequence from the specified location, analyzes the accessed video sequence to extract the specified data, and provide the extracted specified data to the client.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

The following considers a data-enhanced video viewing system and methods for scanning videos in order to detect and extract certain objects, such as human faces, so as to compile non-time based synopses, including "facelines" of people appearing in the video sequence. It also provides a time-based synopsis that includes timestamps for all detected objects. The data-enhanced video viewing system can be deployed on a network for a client to request data extraction on one or more designated videos. The designated video may be one of those that have been uploaded to social networks, uploaded to online video hosting sites, streamed over the Internet or other network, or uploaded directly by the user.

After scanning a video sequence, the system is able to extract the specified data. The system can send the data in real time back to the client. For example, the extracted data includes detected face IDs, coordinates of bounding boxes surrounding the detected faces, and the timestamp of when they were detected. Also, as long as any given object is in the scene over a series of frames, the engine keeps track of it as a unique object and is given a track ID.

The extracted data is returned to the client for data-enhanced video viewing. For example the extracted data may include the coordinates, timestamps and track IDs of faces. These enable the client to draw boxes on the correct locations and frames of a video being played from its native location, synchronized such that the correct data appears as an overlay, on a frame-by-frame basis, with the video being viewed by a user. The client is also provided a synopsis of faces, such as a thumbnail of who makes an appearance in a video. Therefore a client viewer is able to know who or what is in the video in an extracted synopsis form without having to scrub through the entire video. For example, instead of viewing a speeded up video in order to see what is in it, a viewer can request an object-based synopsis, such as "Show me a summary of this video expressed as the automobiles appearing in it"; or "Show me a still image summary of this video based upon the people who appear in it". Furthermore, the extracted data of a video sequence can be used to annotate scenes during a replay of the video. The synopsis and annotation can be shared along with the video on a social network or be accessed by other computer systems.

Figure 1:
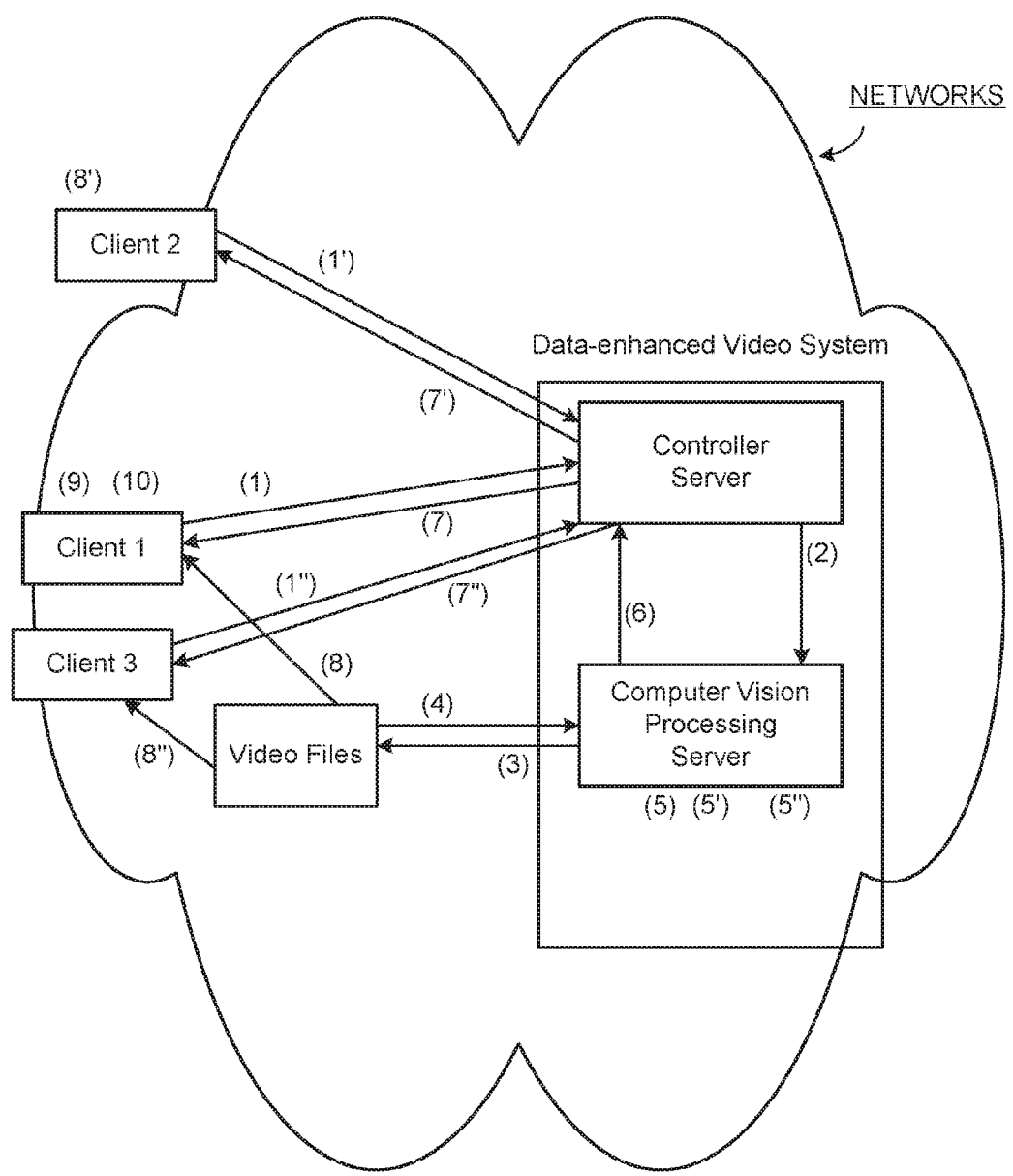
FIG. 1 illustrates the data-enhanced video viewing system operating in a network environment.

FIG. 1 illustrates an example of a data-enhanced video viewing system operating in a network environment that can used to illustrate some of ways the system can be used. In this example, data-enhanced video viewing system includes a controller server and a computer vision processing server. More generally, the techniques described here can be implemented through software, hardware, firmware, or various combinations of these. For example, the servers of FIG. 1 can incorporate specialized ASICs to facilitate the systems operation as a video system. Although a single server can be used for both functions, the exemplary embodiment splits them into two as these are used for different tasks. The controller server is used to handle user requests and then directing to the appropriate processing server. Thus, a controller server can be connected to a range of processing servers and manage the incoming user requests by directing the task to processing servers according to their workload. The processing server or servers are responsible for taking a user request from a controller server and running the computer vision processing (detection, tracking and clustering). A single processing server can handle multiple requests concurrently. Once a task is completed, the processing server reports back to the controller server. The data-enhanced video viewing system is deployed on a network to service requesting clients, such as client 1, client 2 and client 3. Video files to be accessed can be originate from a separate server, a client, a live source of video (such as a set of cameras), or other sources as described below.

In one example, client 1 is a user on a web browser. The user makes a request to scan for faces in a designated video accessible from video files on the web and to have the extracted faces be identified on the video when it is played. An exemplary set of transactions is as follows:

(1) The user sends the request to the controller server to scan and detect all the different faces appearing in a video sequence. The address (e.g. UAL) of the video is provided.

(2) The controller server receives the request and forwards the request together with the video's address to the computer vision processing server.

(3) A request is made by the computer vision processing server to access the video, which could be from a web hosting service, social network, or other online providers.

(4) The video is either streamed to, or downloaded and saved on, the computer vision processing server for processing.

(5) Based on the client request, an appropriate computer vision detection algorithm is initiated on the video. In this example, it is an Object Detection and Tracking (ODT) model for a human face.

(6) For every video frame that is processed by the computer vision detection algorithm, extracted data is returned to the controller server. This can be performed frame-by frame until the entire video is processed.

(7) The controller server receives the extracted data frame-by-frame, and, in accordance with the client's request, parses out the relevant portion and formats it before returning the processed extracted data to the client. Also, a script, or information allowing the information to be rendered at the client, is formed dynamically and sent to the client to help process the processed extracted data at the user's web browser. After the video has been scanned, all the detected faces over the frames are grouped by individual person. Each group belonging to an individual person's face is processed by the object cluster module to select a best representative face for that person. These selected faces will be included as part of the extracted data returned to the controller server.

(8) At a time after making the initial request to the data-enhanced video system, the user's web browser requests the video file.

(9) The video file is loaded and starts to play in the user's web browser after a certain amount of the processed extracted data is received from the controller server. As the video system can access and analyze a video sequence at a rate higher than the standard view rate at which a client would watch the video, if the video file is started prior to receiving the processed extracted data, this can allow for this data to catch up with the video being played. For example, if an initial portion of the video consists of credits or other information from which the data would not be extracted, by the time that the relevant portion of the video begins playing the processed extracted data may already be at the client.

(10) The user's web browser uses the dynamically formed script to render the processed extracted data received from the controller server. For example, the script draws boxes over the video frames based on coordinates and timestamps included in the processed extracted data to highlight the faces detected. Optionally, each detected face may be displayed with annotation previously entered by the user when presented with a roster of selected best faces.

Once client 1 has a data-enhanced video produced by the data-enhanced video system (e.g. video synopsis), it can be shared on the web with other users.

Yet another example is that a client may wish to view a live feed of a video and have it data-enhanced in real time. In this case, the data-enhanced video system may be put in a real-time mode to operate faster at the expense of lower resolution or dropping other features.

In another example, a client, such as client 2, is an authorized third party server on the network. The third party server hosts a data gathering and statistical analysis application where, for example, cars of different models passing a section of traffic are analyzed. The transactions are similar to that for client 1 and the modified portions are as follows:

(1') Client 2 sends the request to the controller server along with the address (e.g. URL) of the video and the scan objects to be all the cars of a specified model passing through a given bridge.

(2')-(4') and (6') (not shown) are respectively similar to (2)-(4) and (6) for client 1.

(5') Based on the client request, the chosen computer vision detection algorithm, which in this example is ODT model for a car of the specified model, is initiated on the video.

(7') The controller server receives the extracted data frame-by-frame, and, in accordance with the client's request, parses out the relevant portion and formats it before returning the processed extracted data to the client. Optionally, a script is formed dynamically and sent to the client to help process the processed extracted data at the third party server.

(8') The third party server receives the extracted processed data and uses it in its application. Optionally, it also uses the dynamically formed script to help manipulate the processed extracted data in its application.

In yet another example, Client 3 is an authorized third party server on the network running a 30-camera video surveillance application for a retail store. The transactions are similar to that for client 1 and the modified portions are as follows:

(1") Client 3 sends the request to the controller server for pictures of unique individuals found in the videos and a list of timestamps/cameras they appeared in. Included in the request are addresses (e.g. URLs) of their 30 camera video feeds or exported video files.

(2")-(4") and (6") (not shown) are respectively similar to (2)-(4) and (6) for client 1.

(5") Based on the client request, the chosen computer vision detection algorithm, which it this example is an ODT model for people, is initiated on the computer vision processing server to scan the video.

(7") The controller server receives the extracted data frame-by-frame, and, in accordance with the client's request, parses out the relevant portion and formats it before returning the processed extracted data to the client. Optionally, a script is formed dynamically and sent to client 3 to help process the processed extracted data at the third party server.

(8") The third party server receives the extracted processed data. If the video surveillance application used by the third party server has an available API and is supported by the controller server, the controller server uses the dynamically formed script to display the photos, allows users to click on the photos to expand a timeline showing when the person was detected, and enables users to click a time/camera for a person to view that playback that specific video/incident.

Controller Server

Figure 2:
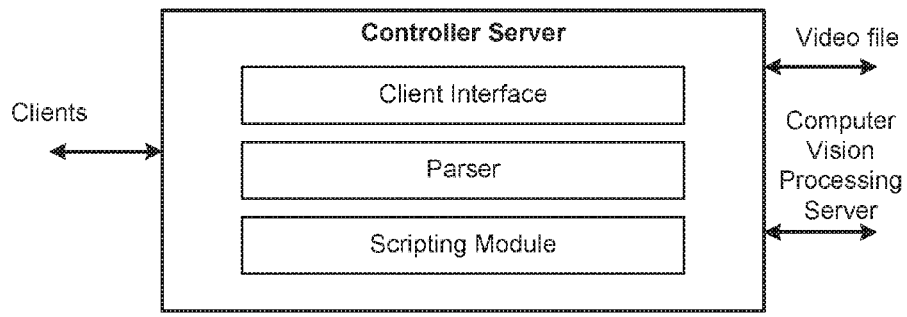
FIG. 2 illustrates some components for a controller server.

FIG. 2 illustrates some of the main components for an embodiment of the controller server. The controller server includes a client interface, a parser and a scripting module. The client interface enables appropriate communication between a client and the controller server. For example, for client 1 in the above examples, which is a web browser, appropriate signaling and HTML message exchange under HTTP protocol can be employed. The parser parses out the relevant portion of the extracted data received from the computer vision processing server in accordance with the client's request. The scripting module creates a script dynamically for execution either by the client or by the controller server so that the processed extracted data are rendered appropriately. For example, it the case of client 1, the script can be in JavaScript which causes the web browser of client 1 (see FIG. 1) to draw boxes around all the detected faces in a video frame and to display a "faceline" of faces at the bottom of the browser window.

Computer Vision Processing Server

Figure 3:
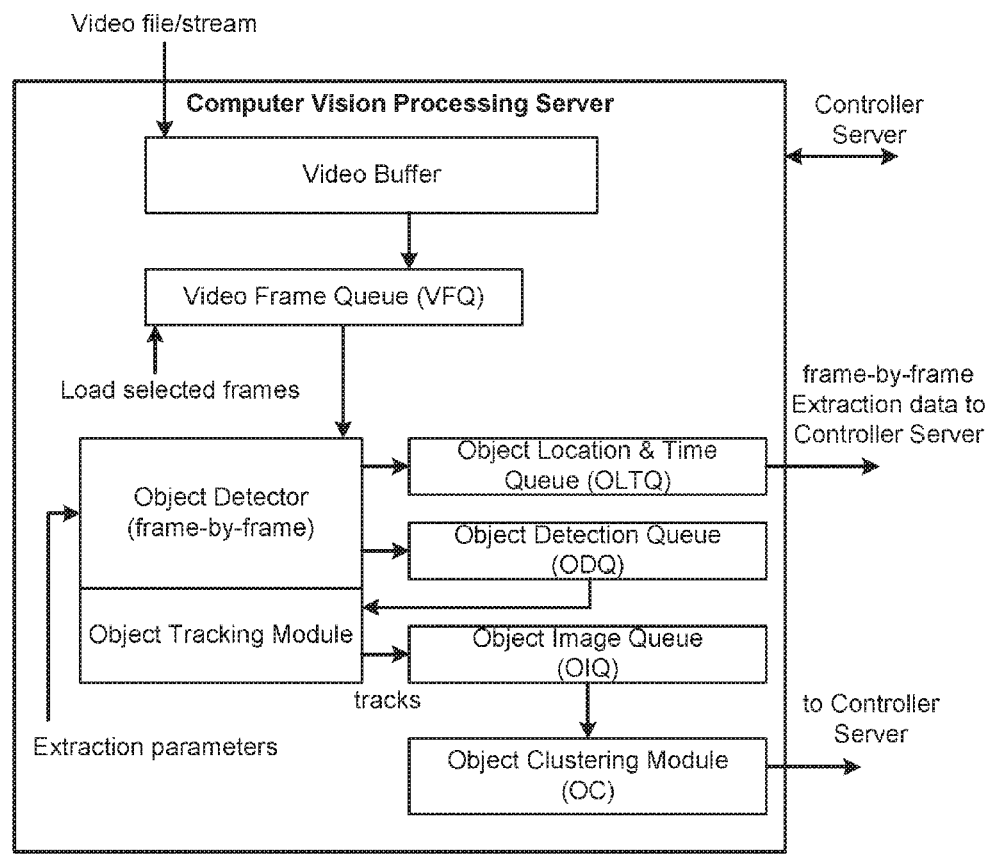
FIG. 3 illustrates some components for a computer vision processing server.

FIG. 3 illustrates some of the main components for an embodiment of the computer vision processing server. The computer vision processing server includes a video buffer, an object detector, an object tracking module and an object clustering module.

The computer vision process server operates with a data structures in the form of various FIFO (first-in-first-out) queues, such as a video frame queue (VFQ), an object detection queue (ODQ), an object image queue (OIQ) and an object ID, location and time queue (OLTQ). These data structures allow access by multiple processes at the same time. Also, once a queued item is read, it can be automatically deleted, which avoids the need to do cleanup.

When a new frame is read, it is stored in the VFQ. After the video has been retrieved into the video buffer, a handler is assigned to the video. The handler is initially used to extract information regarding the video, e.g. frame rate, number of frames and frame size.

Selected frames from the video are loaded to the VFQ frame-by-frame. For example, for high-accuracy requirement, every frame is processed. On the other hand, for high-speed requirement, every SKIP_FRAMES frames between processing are skipped. In the latter case, only selected frames are loaded into the VFQ for processing.

The object detector processes a frame at a time from the VFQ. It receives extraction parameters and searches for objects in a frame that matches the requested object category to be searched. For example, one category of interest is a human face.

Anytime the object detector outputs a detection result (e.g., a detected face), it is stored in the ODQ, which is then used by the object tracking module to assign to a track across different video frames.

ID, location and time information associated with that object (e.g. detected face) is stored in the OLTQ. The location and time information is sent to the controller server as extracted data. The controller server, in turn, forwards the extracted data in real-time to the requesting client after processing it.

For each object track, object detection is performed on each frame. These frame-level detection results are then combined by the object tracking module to determine a final label of the whole object track.

The object tracking module is responsible for associating detected objects (e.g., faces) across frames for consistent labeling throughout a scene. As new views of the same face are followed in a track over a number of frames, the best view of the face is retained (for example by retaining the best view currently available based on detection score) and when a track has terminated, the best view of the detected object (such as a face) on that track is stored in the OIQ. The OIQ may contain multiple images of the object (e.g., the same person may have his or her face appearing on multiple disjoint tracks over the entire video and therefore have multiple images.) Also, it has the ability to maintain a sorted list of the best X (e.g. 10) images of for each object track. In this scenario, every time the object is detected in a frame, it is checked against the list of the best images for that track and placed in a sorted manner. As explained earlier, determination of which object images are best is based on the detection score.

After the video has completed object detection and tracking, the multiple images belonging to the same object (e.g., face) are clustered by the object clustering module to select the best representative object (e.g., face for that person). This is also sent as part of the extracted data to the controller server.

Figure 4:
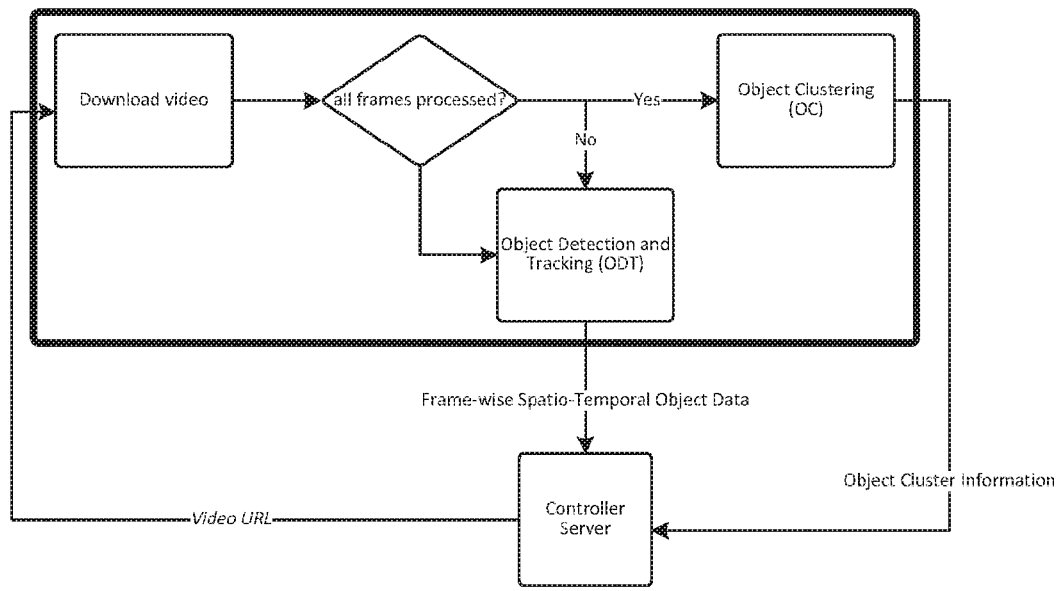
FIG. 4 is a flow diagram that illustrates the general operation of the computer vision processing server shown in FIG. 3.

FIG. 4 is a flow diagram that illustrates the general operation of the computer vision processing server shown in FIG. 3. The controller server instructs the computer vision processing server to load a requested video from a given source. Object detection by the ODT module is performed on the video in a frame-by-frame manner. The extracted data containing ID and spatio-temporal coordinates of each detected object (e.g., face) is sent to the controller server to be forwarded to the requesting client. After the last frame of the video has been processed, the detected objects are clustered by the object clustering module to obtain the best representative object (e.g. face for each individual person found in the video). This clustered information is then sent to the controller server to be forwarded to the requesting client.

Figure 5:
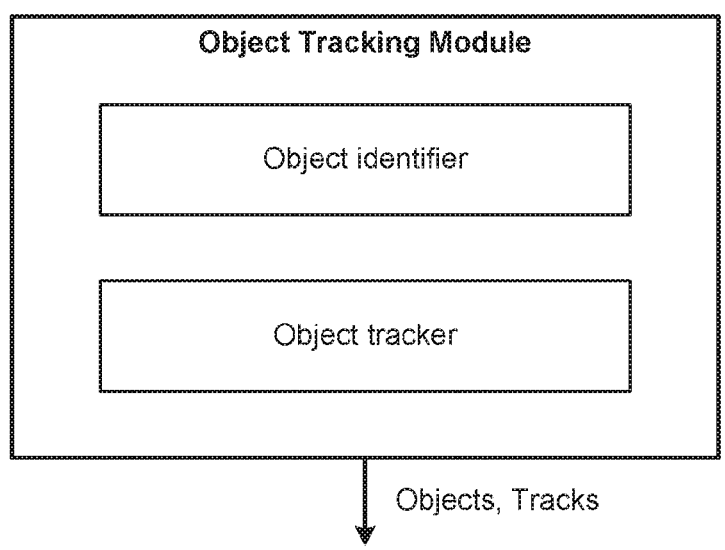
FIG. 5 illustrates the main components for an example of the object tracking module.

FIG. 5 illustrates the main components for an example of the object tracking module. The object tracking module includes an object identifier and an object tracker. Anytime an object (e.g., face) has been detected it is registered in the ODQ. The object identifier identifies the detected object and the object tracker matches the detected object with those in existing object tracks. Each existing object track is a continuous trace of the same object over previous frames and at each frame the best representation of the object currently available is retained. If there is a match, the detected object is added to the existing object track. If not, a new track is started for the detected object.

Each detected object is contained within a bounding box so that it can be simply tracked by the coordinates of its bounding box. The object tracker associates the present regions with those in the previous frame via spatial intersection of bounding boxes. Thus, intersecting-region associations give the new locations of previously tracked objects.

Figure 6:
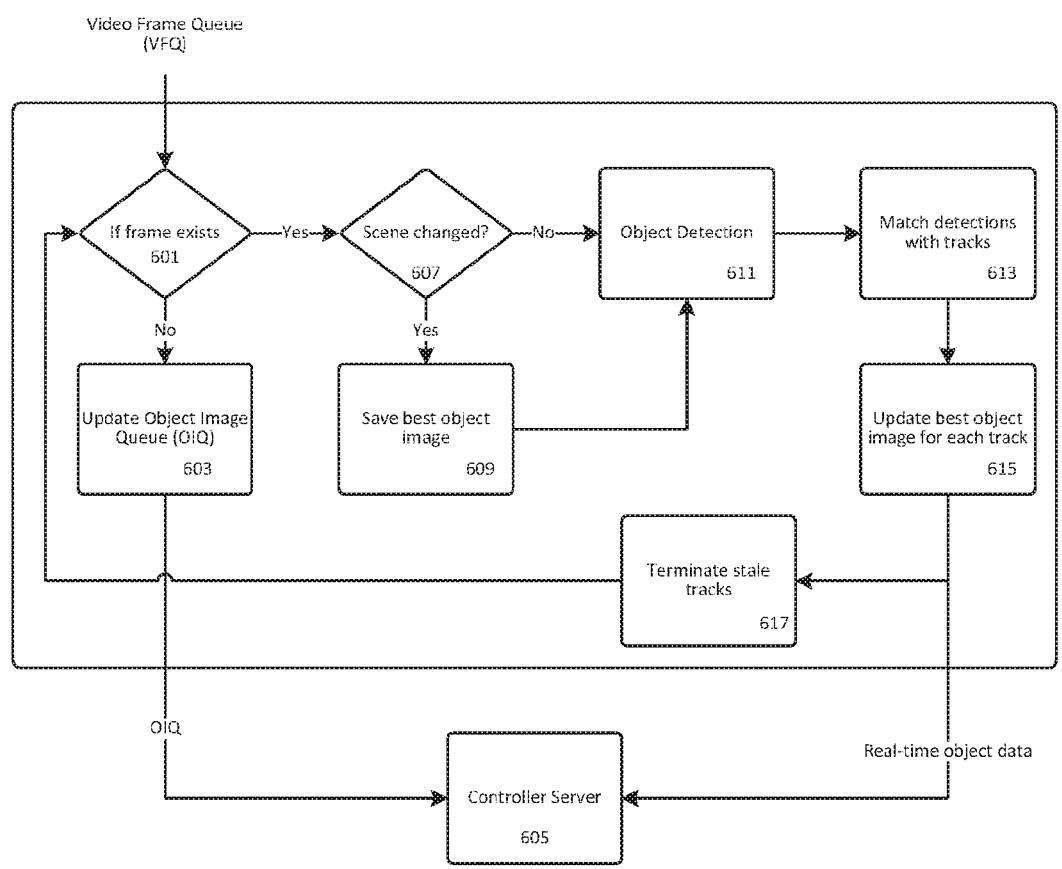
FIG. 6 is a flow diagram that illustrates an example of the general co-operation of the object detector and the object tracking module in the computer vision processing server.

FIG. 6 is a flow diagram that illustrates an example of the general co-operation of the object detector and the object tracking module in the computer vision processing server for detecting faces. The video frame queue is checked at 601 to see if there is another frame to be process. If not, save the best object image(s) for each track by updating the OIQ at 603. Processing of the video is completed and reported out to the controller server at 605.

If there is another frame to process, whether there is a scene change is detected at 607. This function is used to detect if there was a significant change in the scene. This can be accomplished by comparing pixel value histograms of the current and previous frame. If it is above a certain threshold, the best object images per track are saved at 609 and the tracks are reset. This is done to avoid situations where the scene changes but the tracks do not update at the same time, resulting in false detections.

611 is the face, or other specified objects, block. For example, it can look for faces in the current frame using the object detector. Once objects are detected, the detected objects are pruned based on aspect ratio and overlap.

Given the new detections, at 613 the process tries to match them with existing object tracks. A similarity metric may be used to match objects to tracks, which is based on overlap, shape and actual pixel value difference. Also keep count of how many frames have been missed for each object track.

The best object image is updated at 615, maintaining a list of the best object image(s) for each track. For each new frame, it checks to see if the new object image associated with a track is better than the previous best object image(s). If so, update the best object image(s) with the newly detected object image. The real-time object data can be supplied to the controller server at 605.

Stale tracks are terminated at 617. This can be done by determining if any object tracks have been missing for the past MISSED_FRAMES frame. If so, save the best object image(s) and delete the track. The flow then loops back to 601.

The object detector shown in FIG. 3 is developed further in the US patent application entitled "Computer Vision Pipeline and Methods for Detection of Specified Moving Objects" by Case et al., filed on the same day as the present application. For example, the object detector can be implemented using detection techniques such as the Histogram of Oriented Gradients (HOG), deep learning, or a combination of these and other techniques for detection of objects. Taking the Histogram of Oriented Gradients (HOG) as the exemplary embodiment for this discussion, this technique is also discussed further, for example, in Navneet Dalal and Bill Triggs: Histogram of Orient Gradients for Human Detection, in IEEE International Conference on Computer Vision and Pattern Recognition (CVPR), June 2005. Other examples and implementations include: An HOG-LBP Human Detector with Partial Occlusion Handling, in IEEE International Conference on Computer Vision (ICCV), 2009; Face Recognition using Histogram of Oriented Gradients. In Pattern Recognition Letters, September 2011, vol. 32, No. 12; A Discriminatively Trained, Multiscale, Deformable Part Model. In IEEE International Conference on Computer Vision and Pattern Recognition (CVPR), 2008; and An Improved HOG based Pedestrian Detector. Advances in Intelligent Systems and Computing, 2014, Vol. 215.

The object detector is implemented as a HOG object detector with focus on both accuracy and making it real-time. Significant improvement (using refinements and better methodologies) can be achieved in both categories to provide real-time operation and improve accuracy. These additional features will be described below.

The features of the object detector will be illustrated by an example on detecting objects that belong to the human face category. This involves loading a vector descriptor for human face into the HOG detector. The vector descriptor is obtained by training the object detector to detect examples of such faces.

The HOG detector is used to search each frame for the object of interest (e.g., face in this example) detection. The conventional HOG detection need to use a significant number of scales, which in turn makes it much slower than is required in real-time applications. However, in exemplary implementations, the execution speed of HOG detector can be improved. There is often no need to use all available scales that a typical HOG detector uses. In practice use of only MIN SCALES (e.g. $\frac{1}{8}^{th}$ of the total available scales) is often sufficient, yielding a significant N-fold (e.g. 8-fold) increase in performance. Thus, the execution speed of the HOG detector is greatly improved that useful real-time applications are possible.

In case of face detection, the detector is first trained on face detection by learning through a set of exemplary faces. It identifies distinct features important for faces and then learns a detector (which is simply a set of weights for the features) based on these features using a Support Vector Machine (SVM). Once trained, it can perform face detection through processing that includes features extraction and a series of filter convolutions with the frame image. Each filter is designed to look for specific object attributes. Results from the filter responses are then accumulated to indicate the likelihood of the object being categorized as a face. As explained earlier, this methodology can be extended to any object category and is not just restricted to detecting faces.

Figure 7:
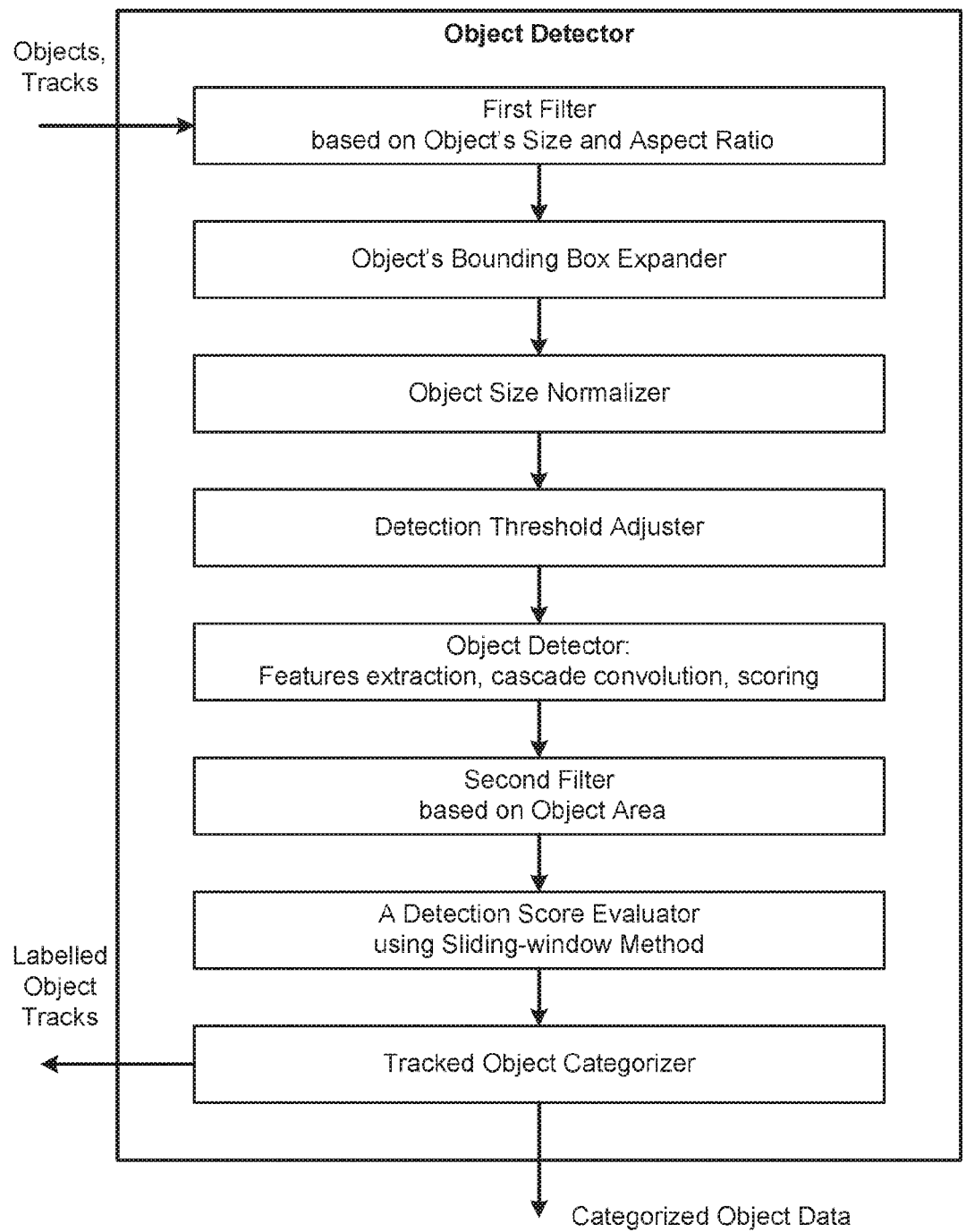
FIG. 7 illustrates the main components for an example of the object detector.

FIG. 7 illustrates the main components of the object detector. It consists of an object detector that processes the whole frame and returns object detections that have scores beyond a certain threshold. The detections are then pruned based aspect ratio and overlap. The object detector is developed further in the U.S. patent application entitled "Computer Vision Pipeline and Methods for Detection of Specified Moving Objects" by Case et al., as cited above.

Detections that pass the aspect ratio and overlap filtering stage are then matched to existing object tracks based on certain similarity metrics (e.g. shape, size, overlap, pixel values). New object tracks are initialized for detections that fail to match to any of the existing object tracks. Once a frame is processed for detections and unnecessary detections filtered out, the computer vision processing server returns detections (Track ID, location and time) back to the controller server.

Each time a new detection is added to an existing track, it is compared against the best object image(s) for that track. The comparison is based on the detection scores returned by the object detector. In case the new detection is among the best X images of the tracked object, it is added to the best object image(s) in a sorted manner (e.g. if the new detection is the $5^{th}$ best, it will be placed in $5^{th}$ position in the best object image(s)). Tracks that have not seen any new detection for MISSED_FRAMES frames are removed after saving the best object image(s) associated with the track. A list of the best object image(s) is maintained for all terminated tracks.

Once the video is finished processing, the best object image(s) are saved for all the tracks (active or passive) to the object image queue (OIQ). The OIQ is then sent to the object clustering (OC) module. The OC extract features (e.g. HOG, Local Binary Pattern (LBP), RGB histogram, etc.) for each of the best object image(s) for each track and passes these features into a clustering mechanism (e.g. K-Means). This groups similar looking objects based on the features and returns the best representative object images for each cluster. The best representations of the clusters, along with a video synopsis thumbnail comprising all cluster representations are saved on the computer vision processing server for the client.

Conclusion

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method for video processing, comprising:
   receiving, at a video system, a request from a first client to provide specified data on a video sequence that is available at a specified location;
   accessing, by the video system, the video sequence from the specified location;
   analyzing, by the video system, the video sequence to extract the specified data, wherein the specified data is derived from objects in the video sequence;
   processing the video sequence on a frame-by-frame basis to extract object boundaries of objects present in a frame;
   determining whether a first frame of the video sequence and a second frame of the video sequence are frames from a scene in common;
   identifying a track, comprising a plurality of frames including the first frame and the second frame, where an identified object appears in each frame of the track;
   selecting a partial video image from one frame of the track to represent the identified object; and
   providing the specified data and the partial video image from the video system to the first client.

2. The method of claim 1, wherein the specified location is specified by URL.

3. The method of claim 1, further comprising:
   providing, from the video system to the first client, information to render the video sequence enhanced by the specified data, wherein the first client accesses the video sequence independently of the video system.

4. The method of claim 3, wherein the information includes a script for rendering content of the specified data as an overlay on the video sequence.

5. The method of claim 3, wherein the video system accesses and analyzes the video sequence and provides the specified data to the first client at a rate whereby the first client is able to render the video sequence enhanced by the specified data in real time.

6. The method of claim 1, wherein the specified data includes one or more non-time based synopses of specified objects to be detected in the video sequence.

7. The method of claim 6, wherein the specified objects include people.

8. A video processing system, comprising:
   a first input for receiving a request from a client to provide specified data on a video sequence that is available at a specified location;
   a second input for receiving the video sequence from the specified location;
   a video analyzer for analyzing the video sequence to extract specified data, wherein the specified data is derived from objects in the video sequence;
   frame storage coupled to the video analyzer allowing the video analyzer to process the video sequence on a frame-by-frame basis to extract object boundaries, wherein the object boundaries are boundaries in frame images of objects present in a frame;
   logic for determining whether a first frame of the video sequence and a second frame of the video sequence are frames from a scene in common;
   logic for identifying a track, comprising a plurality of frames including the first frame and the second frame, where an identified object appears in each frame of the track;
   logic for selecting a partial video image from one frame of the track to represent the identified object; and
   an output for providing the specified data and the partial video image to the client.

9. The video processing system of claim 8, wherein the output for providing the specified data and the partial video image outputs the specified data prior to receiving a subsequent frame, thereby allowing for real time video feature extraction.

10. The video processing system of claim 8, wherein the specified data includes data records, wherein each data record of the data records includes a field indicating a type, a field indicating an object identifier and a field indicating object boundary coordinates.

11. The video processing system of claim 8, wherein the output is configured to provide the specified data and the partial video image in an overlapping video display with the specified data comprising at least object boundaries of objects in the partial video image and wherein the overlapping video display includes the object boundaries.

12. The video processing system of claim 8, wherein the output is configured to provide the specified data and the partial video image to the client with instructions on how to generate an overlapping video display with the specified data comprising at least object boundaries of objects in the partial video image with the overlapping video display including the object boundaries.

13. The video processing system of claim 12, wherein the instructions are provided on a frame-by-frame basis.

14. The video processing system of claim 8, wherein the partial video image is filtered to exclude content that is outside of the object boundaries, thereby forming a synopsis of identified objects.

15. The video processing system of claim 8, wherein the video analyzer is configured to identify an object across a plurality of frames and select a best representative image for representing the object in a thumbnail display.

16. The video processing system of claim 8, further comprising:
   a video buffer;
   a video frame queue (VFQ) for storing a frame after being read;
   a frame handler for extracting, from the frame, a frame rate and a frame size;

an object detector;
an object detection queue (ODQ);
an object tracking module that tracks objects across different video frames;
an object image queue (OIQ);
an object clustering module; and
an object ID, location and time queue (OLTQ).

17. A method for video processing, comprising:
receiving a request from a client to provide specified data on a video sequence, wherein the request includes a specification of a network location at which the video sequence can be obtained;
accessing the video sequence from the network location;
processing the video sequence on a frame-by-frame basis to extract object boundaries of objects present in a frame;
determining whether a first frame of the video sequence and a second frame of the video sequence are frames from a scene in common;
identifying a track, comprising a plurality of frames including the first frame and the second frame, where an identified object appears in each frame of the track;
selecting a partial video image from one frame of the track to represent the identified object; and
sending, to the client, position/timing data representing positions and timing of the object boundaries, including durations over multiple frames from a start frame to an end frame for each of the object boundaries, at least a portion of the video sequence, and a set of instructions usable by the client to construct a modified video sequence comprising the portion of the video sequence modified by the object boundaries.

18. The method of claim 17, wherein processing the video sequence is performed substantially in real time.

19. The method of claim 17, wherein the portion of the video sequence comprises portions of video frames that are within object boundaries.

20. The method of claim 19, wherein the modified video sequence would be a video sequence forming a synopsis video showing specified objects detected in the video sequence and the position/timing data includes timestamps for appearances of specific objects in the video sequence.

21. The method of claim 20, wherein the synopsis video comprises people in the video sequence.

22. The method of claim 17, further comprising adjusting a resolution of the position/timing data to omit frames and/or pixel resolution to reduce processing time.

23. The method of claim 17, wherein sending the position/timing data and the set of instructions to the client is done without sending the video sequence to the client when the video sequence is available to the client from the network location directly.

24. A method for video processing, comprising:
receiving a request from a client to provide specified data on a video sequence, wherein the request includes a specification of a network location at which the video sequence can be obtained;
accessing the video sequence from the network location;
processing the video sequence on a frame-by-frame basis to extract object boundaries of objects present in a frame;
determining whether a first frame of the video sequence and a second frame of the video sequence are frames from a scene in common;
identifying a track, comprising a plurality of frames including the first frame and the second frame, where an identified object appears in each frame of the track;
selecting a partial video image from one frame of the track to represent the identified object and
sending, to the client, position/timing data representing positions and timing of the object boundaries, including durations over multiple frames from a start frame to an end frame for each of the object boundaries, at least a portion of the video sequence, and a set of instructions usable by the client to construct a modified video sequence comprising the portion of the video sequence modified by the object boundaries, wherein the position/timing data includes data representing faces identified in tracks using object identifiers, coordinates of object boundaries around identified faces, determinations of sequences of video frames in which the identified faces appear.

25. The method of claim 24, wherein the determinations of sequences of video frames in which the identified faces appear are constrained by scene changes, whereby a detected scene change delimits object identifiers so that when a given object is in a scene over a series of frames, it has a unique object identifier.

* * * * *